United States Patent
Paulis et al.

(10) Patent No.: US 8,831,698 B1
(45) Date of Patent: Sep. 9, 2014

(54) DEVICE AND MODULE INTERFACE

(75) Inventors: Jonathan A. Paulis, Atlanta, GA (US); Mark Edward Causey, Tucker, GA (US); Scott Andrus, Tucker, GA (US); Robert Z. Evora, Douglasville, GA (US); Coulter C. Henry, Jr., Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1043 days.

(21) Appl. No.: 11/772,645

(22) Filed: Jul. 2, 2007

(51) Int. Cl.
  *H04M 1/00* (2006.01)
(52) U.S. Cl.
  USPC ............ 455/575.8; 455/575.1; 379/440; 379/446
(58) Field of Classification Search
  USPC ............ 206/305, 214, 224, 349, 320; 455/575.1, 575.8; 379/440, 446
  See application file for complete search history.

(56) References Cited

U.S. PATENT DOCUMENTS

| | | | | |
|---|---|---|---|---|
| 5,105,338 A | * | 4/1992 | Held | 361/679.09 |
| 5,971,148 A | * | 10/1999 | Jackson | 206/320 |
| 6,264,029 B1 | * | 7/2001 | Motson | 206/320 |
| 6,283,299 B1 | * | 9/2001 | Lee | 206/760 |
| 6,876,875 B2 | * | 4/2005 | Shimazaki et al. | 455/575.1 |
| 6,995,976 B2 | * | 2/2006 | Richardson | 206/320 |
| 7,444,176 B2 | * | 10/2008 | Oda et al. | 455/575.3 |
| 7,505,798 B2 | * | 3/2009 | Hofer et al. | 455/575.1 |
| 7,673,745 B2 | * | 3/2010 | Sirichai et al. | 206/45.23 |
| 2003/0100338 A1 | * | 5/2003 | Lee | 455/556 |
| 2003/0137584 A1 | * | 7/2003 | Norvell et al. | 348/61 |
| 2005/0146844 A1 | * | 7/2005 | Hussaini et al. | 361/681 |
| 2006/0226805 A1 | * | 10/2006 | Yu | 320/107 |

* cited by examiner

*Primary Examiner* — Mickey Yu
*Assistant Examiner* — Chun Cheung
(74) *Attorney, Agent, or Firm* — Hartman & Citrin LLC

(57) ABSTRACT

A device holster configured to hold a device and at least one accessory module is disclosed. The accessory module can be an electronic module or a non-electronic module. In one embodiment, the accessory module is inserted into a pouch. The pouch includes a pouch interface for communication of data and/or transmission of power between an accessory module interface and a device interface. The pouch can be positioned on a face of the device holster or alternatively may be hingedly connected to the device holster. The accessory module may alternatively be built into the device holster or removably attached. The device holster may be integrated into an article of clothing or itself may be an article of clothing.

14 Claims, 5 Drawing Sheets

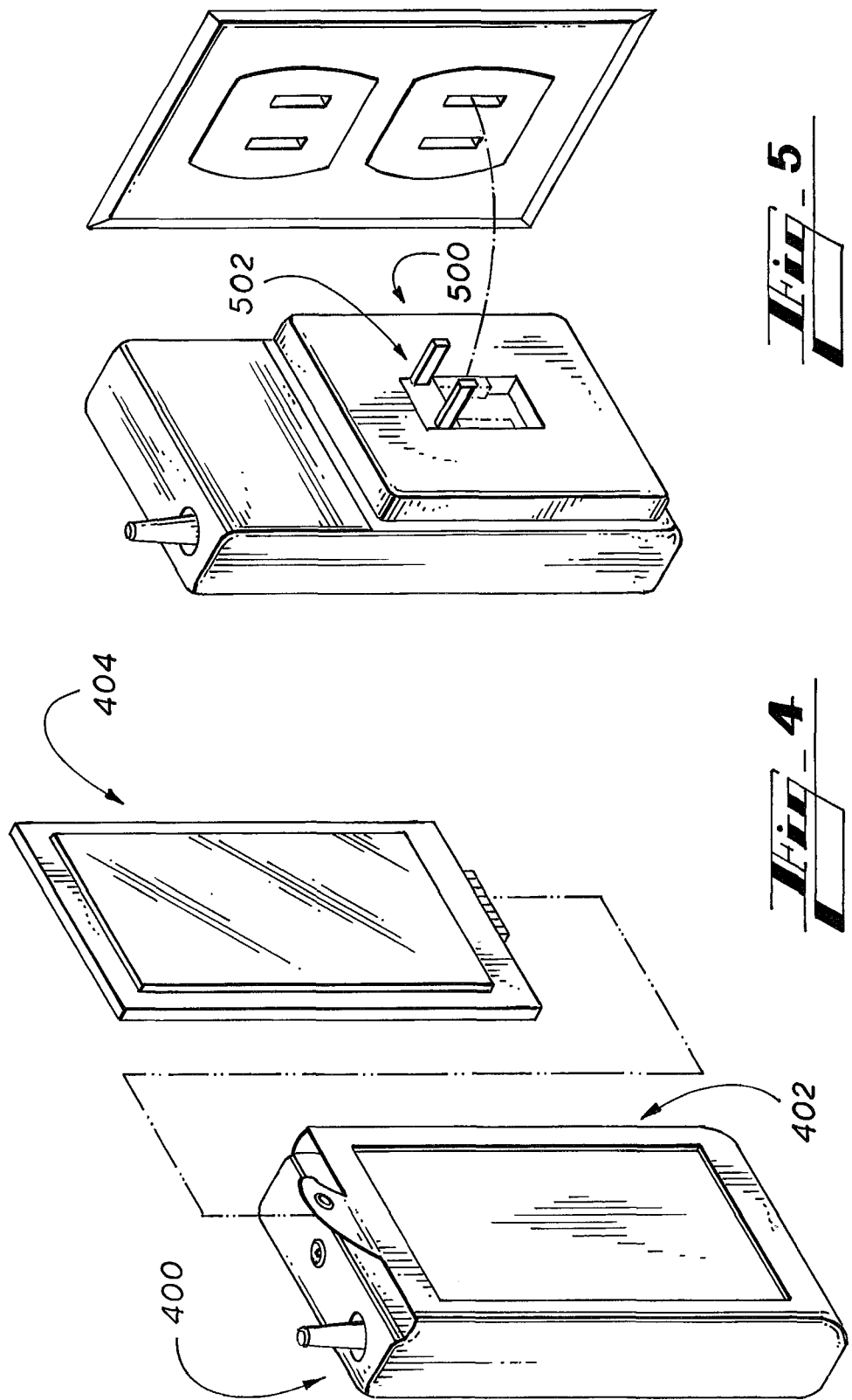

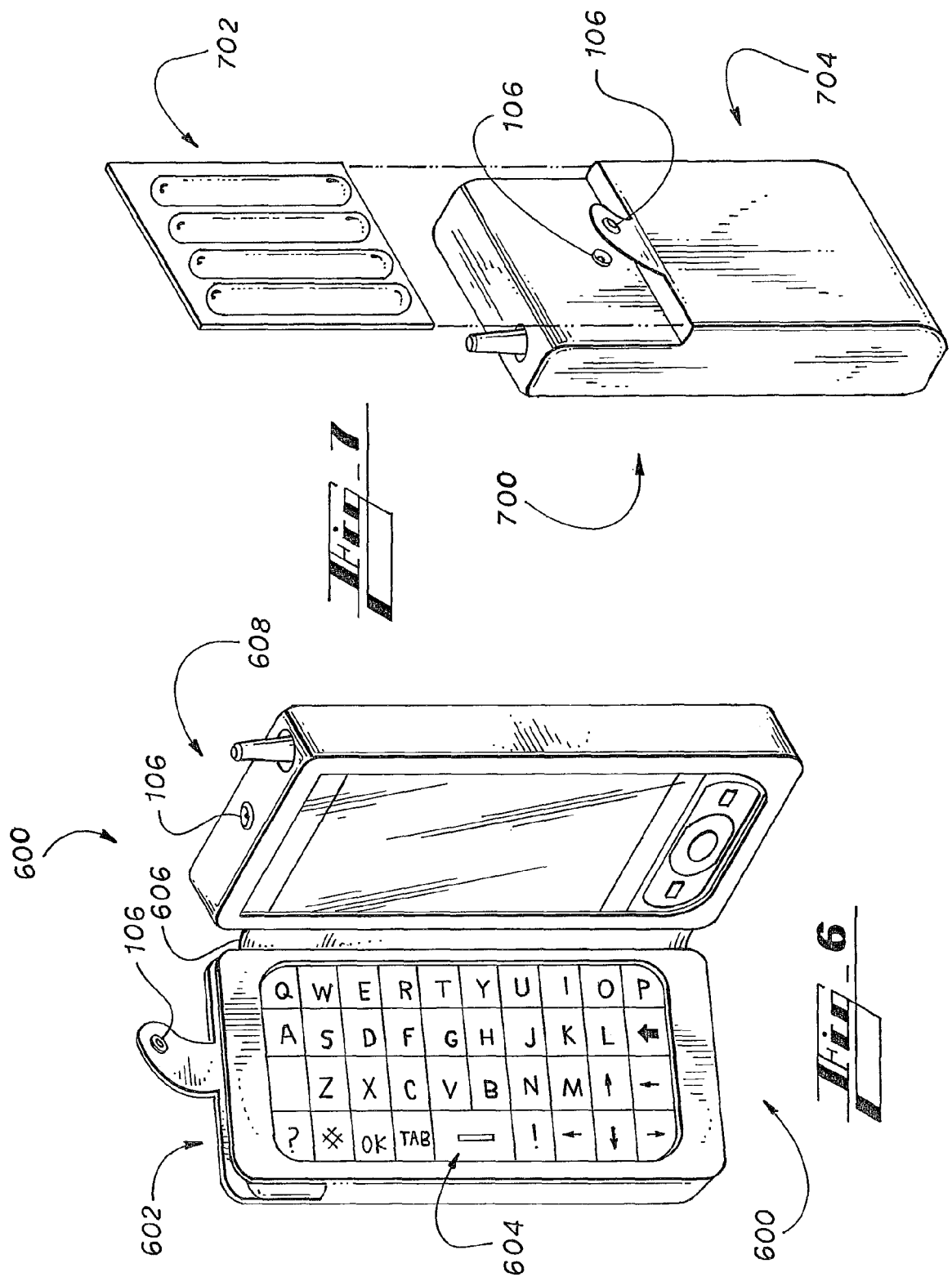

DEVICE AND MODULE INTERFACE

TECHNICAL FIELD

The present invention relates generally to device holsters and, more particularly, to a device holster configured to support one or more accessory modules for adding at least one feature to a device.

BACKGROUND OF THE INVENTION

Portable handheld devices, such as cellular telephones, media players, and personal digital assistants (PDAs), have become ubiquitous in today's society. Many of these devices offer a combination of communication, organization, and entertainment features in a single device. With the large number of features available on these devices, it is difficult to provide a desirable ergonomic design and an easy-to-use, yet powerful user interface. Many of these devices are plagued with thick battery packs, others suffer from small keypads, and still others have low resolution displays better suited for text rather than for graphics and video.

Devices do exist, however, that include large high-resolution displays that may span substantially the entire face of the device with digital keypads used in lieu of or in combination with a hard keypad. Other devices exist that feature extendible/retractable keypads that are typically larger than the keypads used on the face of many devices. This design, although a welcome improvement for those users needing or wanting a larger keypad, creates a substantially thicker device and reduced ease of portability.

Device holsters exist to make handling of a device more comfortable and practical. Device holsters typically offer protective features to prevent damage from ordinary use. Others offer further protection to prevent damage in the event the device is dropped on a hard surface. Still others offer water resistance or water proofing to reduce or prevent seepage of water or other fluids into the device components. Device holsters may also offer a belt clip or other attachment mechanism to secure the device to the user's garment or accessory, such as a belt or purse. Other holsters are adapted to secure the device to the interior of an automobile, for example, during hands-free communication via a BLUETOOTH® headset, earpiece, or vehicle system; or, to facilitate a direct connection with a vehicle hands-free system.

Notwithstanding the respective improvements in the aforementioned devices and holsters, the industry has not yet turned its attention to addressing future potential obstacles and problems. For example, creative and innovative solutions do not yet exist to address the potential need to add features to devices through an add-on accessory module, to alter or customize device features at will, and to otherwise expand the functional capabilities of portable devices as needed or desired. Thus, what may be needed both presently and in the future is a creative and innovative solution that allows a user to add, alter, expand and otherwise customize the features of their device(s) as needed or desired.

SUMMARY OF THE INVENTION

The aforementioned deficiencies are overcome by providing a device interface configured to house at least one accessory module that is intended to provide at least one additional feature or function to a device.

Such a device interface, here illustrated as a holster, is formed from a material that is configured to accommodate a device and at least one accessory module. In one embodiment, the device holster includes a pouch configured to receive at least one accessory module. The pouch includes a pouch interface configured to mate with a module interface of the accessory module. The pouch interface and the module interface are capable of supporting a data communication and/or a power transmission between the pouch interface and the module interface. A device interface, in communication with the pouch interface, is capable of supporting a data communication and/or power transmission between the device interface and the pouch interface.

In another embodiment, the device holster includes a pouch portion configured to receive at least one accessory module, a main body portion configured to receive a device, a hinge for connecting the pouch portion to the main body portion, and a pouch interface configured to mate with a module interface of the accessory module. The pouch interface and the module interface are capable of supporting a data communication and/or power transmission between the pouch interface and the module interface. The device holster also includes a device interface that is in communication with the pouch interface and is capable of supporting a data communication and/or power transmission between the device interface and the pouch interface.

In yet another embodiment, the device holster includes a main body portion and means for securing to attach and secure at least one accessory module to the main body portion.

An accessory module is also described. The accessory module is configured to add at least one function or feature to an existing device. The accessory module is configured to be positioned within a device holster, or to be attached to the device holster. The accessory module includes a first interface for mating with a second interface, wherein the second interface is one of a device interface or a pouch interface. The accessory module also includes electronic circuitry for providing at least one function to the device.

BRIEF DESCRIPTION OF THE DRAWINGS

FIG. 3 illustrates an exemplary power source configuration for the device holster and accessory module of FIG. 1, according to the present invention.

FIG. 4 illustrates an exemplary embodiment of a display module inserted into a suitable device holster, according to the present invention.

FIG. 5 illustrates an exemplary embodiment of a device charger module, according to the present invention.

FIG. 6 illustrates an exemplary embodiment of a hinged device holster configured to support a keypad, according to the present invention.

FIG. 7 illustrates an exemplary embodiment of a device holster configured to support a chemical heating element, according to the present invention.

DETAILED DESCRIPTION OF THE INVENTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model, or pattern. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

It must be noted that, as used in the specification and the appended claims, the singular forms "a," "an," and "the" include the plural referents unless the text clearly dictates otherwise.

Figure 1:
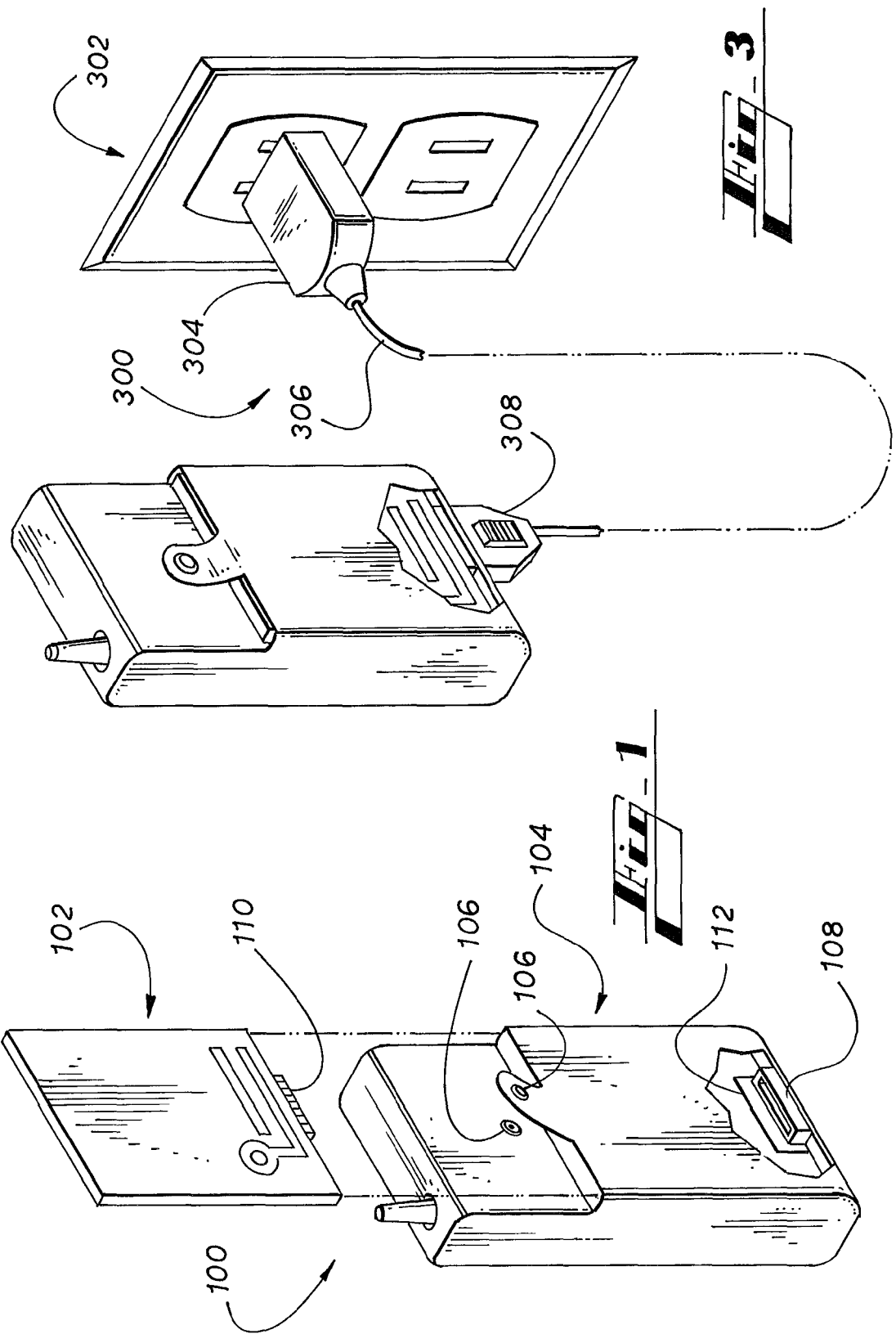
FIG. 1 illustrates an exemplary embodiment of a device holster and accessory module, according to the present invention.

Referring now to the drawings, wherein like numerals represent like elements throughout the several views, FIG. 1 illustrates an exemplary embodiment of a device holster 100 and accessory module 102 in accordance with the present invention. As used herein, the term "holster" includes a case, holder, or any other article of manufacture used to carry a portable mobile communications and/or media device and to provide an interface to at least one accessory module to provide a data communication and/or a power transmission between the device and the accessory module. Clothing, such as a jacket, for example, may be used to hold the device and to provide an interface to support at least one accessory module. The device and the accessory module may be co-located or in different locations on the jacket. This embodiment and other equivalent embodiments will become readily apparent upon reading the below description.

The holster may be formed from any suitable material including, but not limited to, leather, neoprene, faux leather, vinyl, cotton, plastic, cloth, elastomeric material, metal, other material or fabric, combinations thereof, and the like. As used herein, the term "device" includes, but is not limited to, a cellular telephone, a personal digital assistant (PDA), a smart phone, a digital media player, an analog media player, combinations thereof, and the like.

Figure 8:
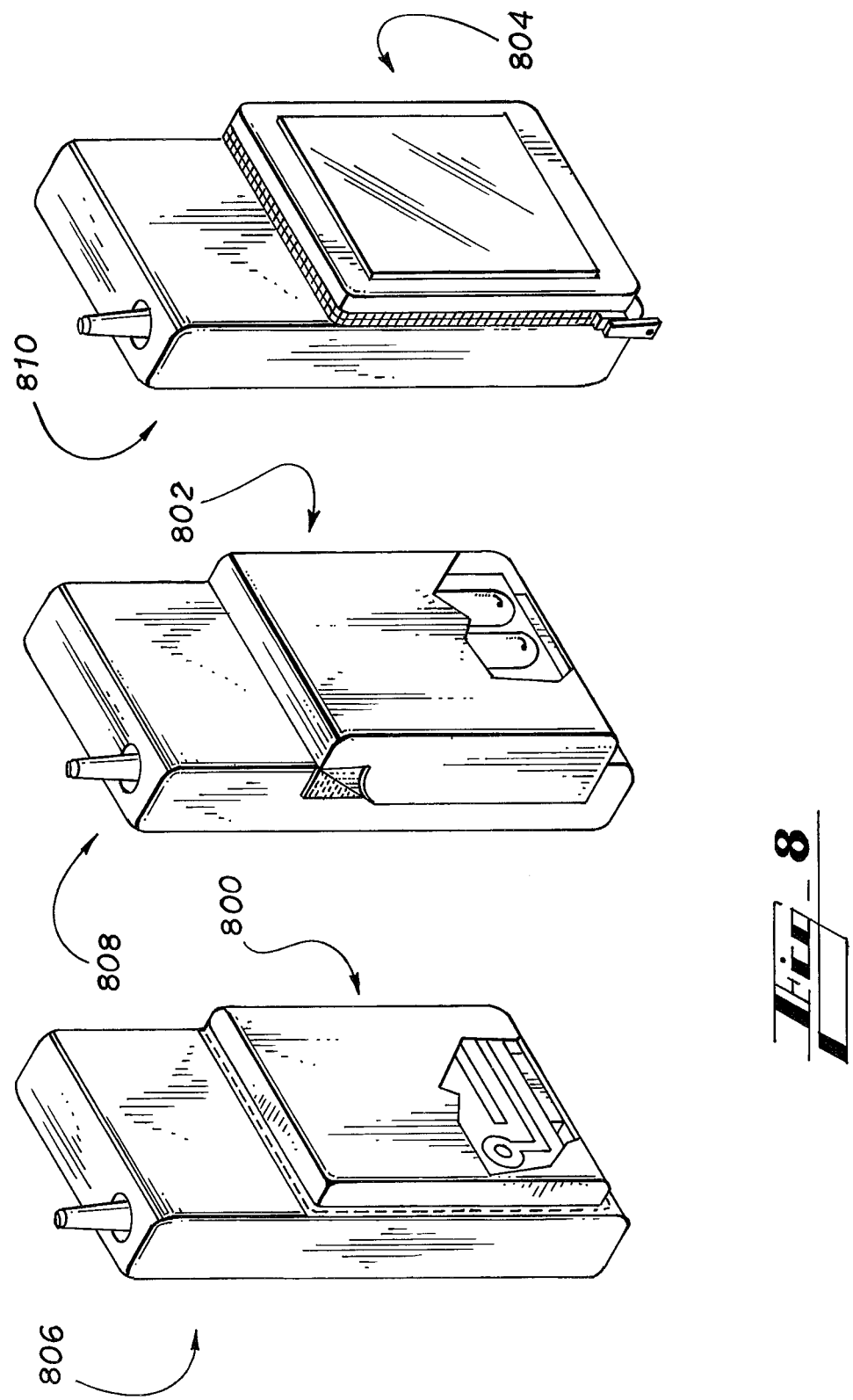
FIG. 8 illustrates several exemplary device holsters and accessory modules, according to the present invention.

The illustrated device holster 100 includes a pouch 104 that is configured to receive at least one accessory module 102. The illustrated pouch 104 is configured to securely enclose the accessory module 102 by connecting a button 106. Other suitable means for securing include tape, staples, interlocking portions (of the device holster 100 and accessory module 102), a VELCRO® brand fastener, glue or other adhesives, clasps, rivets, zippers, thread, snaps, hook and eye, tight fit, combinations thereof, and the like. Several of these alternatives are illustrated in FIG. 8.

The illustrated pouch 104 includes a pouch interface 108 for receiving a module interface 110 of the accessory module 102. Likewise, as an alternative, the module interface 110 may be configured to receive the pouch interface 108. The pouch interface 108 is illustrated as being in communication with a device interface 112, for conunmunicating data and/or supplying power to/from a device to the accessory module 102 via the pouch and mobile interfaces 108, 110, respectively. The connection between the pouch interface 108 and the device interface 112 may be a wired connection or a wireless connection.

The means for interfacing each of these interface types can be, for example, an Integrated Drive Electronics (IDE) interface, a Small Computer System Interface (SCSI), a Universal Serial Bus (USB) interface, a mini-USB interface, an IEEE-1394 FireWire interface, an Ethernet interface, an RJ-11 interface, a BLUETOOTH® interface, an infrared interface, an Infrared Data Association (IrDA) interface, a Molex connector, an inductive coupling, RF energy for wireless power, and any other proprietary or non-proprietary interface, wireless or wired interface type for the communication of data and/or power transmission among the various interfaces.

The illustrated accessory module 102 can be manufactured for a variety of form factors consistent with the specifications of the device holster 100 and the complementing device (not shown).

The illustrated accessory module 102 is an electronic module. In one embodiment, the accessory module 102 provides convenience features, such as a heating element. The heating element may draw power from the device power source (e.g., device battery), directly from an external power source (e.g., a wall outlet or an accessory outlet/cigarette lighter outlet), or from an on-board power source. The device holster 100, in this embodiment, can be configured to dissipate the heat generated by the heating element away from the device so as to protect the device components. This may be accomplished by a metal heatsink or by other heat dissipation techniques. Further, the heating element may be intended to heat only a portion of the device holster 100 so as to warm a user's hands while using the device in cold weather.

In another embodiment, the heating element is removable from the pouch 104 and may be tethered to the pouch interface 108 via a power cord, for example, if the heating element is configured to operate from the device power source or via a restraint cord if the heating element is self-powered. In either case, the cord may be retractable into the device holster 100 or the heating element. This configuration allows a user to remove the heating element from the device holster to warm their hands or other body parts without subjecting the device itself to the heat. The heating element can generate heat through resistive heating technologies and other heating technologies known in the art, such as harnessing solar energy. In yet another embodiment, the device holster 100 functions as a charging station for the heating element or other accessory module 102. Other embodiments may simply offer a docking station for the module.

Another example of a convenience feature is an accessory module configured with a light source. The light source can be a solid-state light source, such as a single Light Emitting Diode (LED) or an LED array, for example. An LED is meant to describe an illumination source that is capable of receiving an electrical signal and producing a color of light in response to the signal. Thus, the term "LED" should be understood to include light emitting diodes of all types, including white LEDs, infrared LEDs, ultraviolet LEDs, visible color LEDs, light emitting polymers, semiconductor dies that produce light in response to current, organic LEDs, electro-luminescent strips, silicon based structures, which emit light, and other such systems. In an embodiment, an "LED" may refer to a single light emitting diode package having multiple semiconductor dies that are individually controlled. It should also be understood that the term "LED" does not restrict the package type of the LED. The term "LED" includes packaged LEDs, non-packaged LEDs, surface mount LEDs, chip on-board LEDs, and LEDs of all other configurations. The term "LED" also includes LEDs packaged or associated with phosphor, wherein the phosphor may convert energy from the LED to a different wavelength.

Other light source types are also contemplated, such as, but not limited to, incandescent (conventional, halogen, or parabolic aluminized reflector), fluorescent (compact fluorescent, linear fluorescent, or induction lamp), gas discharge (high intensity discharge, mercury-vapor, metal halide, neon, sodium vapor), electric arc (arc lamp, HMI, xenon arc, Yablochkov candle), and other types of light including sulfur lamps, LEDs, lamps, optical fiber, plasma, electroluminescent wire, and organic LEDs.

The light source may be an illuminating source or may be present for merely aesthetic purposes to display a logo, theme, or design, such as a corporate logo or design. The configuration can be adjusted by a switch or button to turn the configuration on-off, or to generate flashing or intermittent logos or designs of the same or different colors.

An "illuminating source" includes a light source that produces a frequency of radiation with the intent to illuminate a space, environment, material, object, or other subject. Moreover, the light source may be programmable. A programmable light source may be configured to display text, scrolling, text, still images, moving images, or videos, for example. The light source may also feature a strobe. The light source may also be adjustable in terms of brightness and color with or without the addition of filters.

The term "color" includes any frequency of radiation, or combination of different frequencies, within the visible light spectrum. The term "color" also encompasses frequencies in the infrared and ultraviolet areas of the light spectrum, and in other areas of the electromagnetic spectrum where illumination sources may generate radiation.

The light source may also provide a visual indication of an incoming call or the transmission of a text message, multimedia message, page, e-mail, instant message, or other data transmitted to/from the device.

In another embodiment, the accessory module 102 is a power source for the device. The power source can include one or more solar panels for converting light energy to electricity for use by the device and any connected peripheral devices. The solar panel may alternatively or additionally be configured to recharge the on-board device battery.

As an alternative, the power source can include a battery pack configured to accept common household battery types (i.e., AAA, AA, C, D, and 9V). The power source can also include a custom battery pack configured for various voltage and capacity requirements. The batteries can be alkaline, rechargeable alkaline, Nickel-Metal Hydride (NiMH), Nickel-Cadmium (NiCad), Lithium, Lithium Polymer (Li-Poly), Carbon Zinc, Zinc Chloride, and the like. A combination solar panel and battery pack is also contemplated.

In yet another embodiment, the accessory module 102 is a computer-readable media. Computer-readable media can be any media accessible by the device and includes volatile and non-volatile media, removable and non-removable media. By way of example, and not limitation, computer-readable media can include storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital versatile disc (DVD) or other optical disk storage, magnetic tape, magnetic disk storage or other magnetic storage devices, or any other medium that can be used to store the desired information and which can be accessed by the device.

In still another embodiment, the accessory module 102 is a communications module. A communications module can be used to facilitate wired/wireless communications with external systems, for example, cellular networks, VoIP (voice-over-IP) networks, local wireless networks, or personal wireless networks such as Wi-Fi, WiMax, and so on. The communications module can also include a transceiver for unlicensed communications (e.g., Wi-Fi, WiMax, BLUETOOTH®, etc.) for corresponding communications. The communications module can also facilitate communications reception from terrestrial radio networks (e.g., broadcast), digital satellite radio networks, and Internet-based radio services networks. The communications module is intended to be added to the device via the device holster 100 to support at least one communications type in addition to or as an alternative to the communications type initially supported by the device. For applications where the device receives entertainment signals such as from a terrestrial or satellite radio service, the communications module may include a screen (e.g., an LCD screen) to display information relevant to the received signal; that is, station, artist, song title, album title, local time, weather information, traffic information, volume setting, and the like.

In another embodiment, the accessory module 102 is an input/output (I/O) module. An I/O module can be used to offer additional or enhanced I/O functionality to the device. By way of example, and not limitation, an I/O module can be a speaker, a microphone, a display, a touchscreen display, a keyboard, a keypad, a touchpad, a mouse pad, a trackball, a printer, a plotter, a still camera, a camcorder, a fingerprint recognition device, a voice recognition device, a retina scanner, or any other I/O device or I/O device peripheral.

Figure 2:
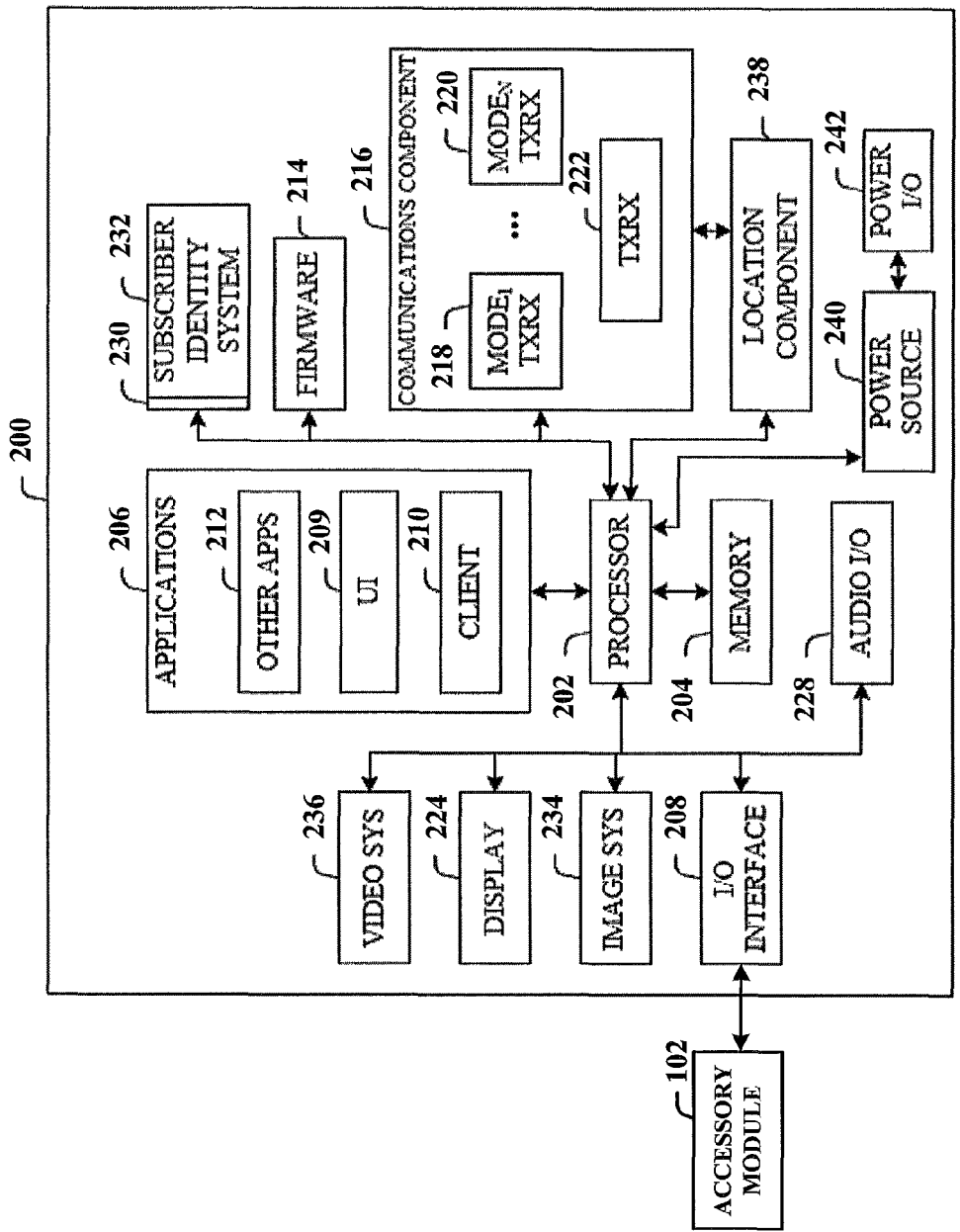
FIG. 2 illustrates an exemplary embodiment of a device configured to communicate with an accessory module, according to the present invention.

Referring now to FIG. 2, an exemplary device 200 for use with the device holster 100 and accessory module 102 is illustrated in accordance with the present invention. It should be appreciated that the present invention allows any of the following features to be added to a device via the addition of an appropriate accessory module 102 through a connection established via the holster and device interfaces 108, 110, respectively. Moreover, the device interface 112 is realized through the I/O interface 208 of the illustrated device 200.

The device 200 (e.g., a cell phone) can include a variety of computer-readable media. Computer-readable media can be any available media accessed by the device and include volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital versatile disc (DVD) or other optical disk storage, magnetic tape, magnetic disk storage or other magnetic storage devices, or any other medium that can be used to store the desired information and that can be accessed by the device 200.

The device 200 includes a processor 202 for controlling and processing on-board operations and functions. A memory 204 interfaces to the processor 202 for the storage of data and one or more applications 206 (e.g., a video player software, user feedback component software, etc.). The applications 206 can also include a user interface (UI) application 209 that operates with a client 210 (e.g., operating system) to facilitate user interaction with handset functionality and data, for example, answering/initiating calls, entering/deleting data, configuring settings, address book manipulation, multimode interaction, etc. The applications 206 can include other applications 212 installed with the device 200 and/or installed as add-ons or plug-ins to the client 210 and/or UI 209, for example, or for other purposes, such as software support for an accessory module.

The other applications 212 can include voice recognition of predetermined voice commands that facilitate user control, call voice processing, voice recording, messaging, e-mail processing, video processing, image processing, music play, as well as subsystems or components described infra. Some of the applications 206 can be stored in the memory 204 and/or in a firmware 214, and executed by the processor 202 from either or both the memory 204 and the firmware 214. The firmware 214 can also store code for execution in power-up initialization and control during normal operation of the device 200. The firmware 214 may be upgradeable and/or updateable to facilitate the addition of an accessory module. Likewise, the accessory module itself may have updateable and/or upgradeable firmware.

A communications component 216 can interface to the processor 202 to facilitate wired/wireless communications with external systems, for example, cellular networks, VoIP (voice-over-IP) networks, local wireless networks or personal wireless networks such as Wi-Fi, Wi-Max, and so on. Here, the communications component 216 can also include a multi-mode communications subsystem for providing cellular communications via different cellular technologies. For example, a first cellular transceiver 218 (e.g., GSM) can be one mode and an Nth transceiver 220 can provide cellular communications via an Nth cellular network (e.g., UMTS), where N is a positive integer. The communications component 216 can also include a transceiver 222 for unlicensed communications (e.g., Wi-Fi, Wi-Max, BLUETOOTH®, etc.) for corresponding communications. Likewise, the accessory module 102 can provide this functionality for devices that do not include this feature. The communications component 216 can also facilitate communications reception from terrestrial radio networks (e.g., broadcast), digital satellite radio networks, and Internet-based radio services networks.

The device 200 can process IP data traffic via the communications component 216 to accommodate IP traffic from an IP network such as, for example, the Internet, a corporate intranet, a home broadband network, a personal area network, etc., via an ISP or broadband cable provider. Thus, VoIP traffic can be utilized by the handset 200 and IP-based multimedia content can be received in an encoded and/or decoded format.

The device 200 includes a display 224 for displaying multimedia that include text, images, video, telephony functions (e.g., a Caller ID function), setup functions, menus, etc. The display 224 can also accommodate the presentation of multimedia content (e.g., music metadata, messages, wallpaper, graphics, etc.).

An I/O interface 208 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 208 can be utilized for updating and/or troubleshooting the device 200, for example. Wireless connections are also contemplated, such as through BLUETOOTH® or other near-field communications.

Audio capabilities can be provided via an audio I/O component 228 that can include a speaker for the output of audio signals related to, for example, indication that the user pressed the proper key or key combination to initiate the user feedback signal, call signals, music, etc. The audio I/O component 228 also facilitates the input of audio signals via a microphone to record data and/or telephony voice data, and for inputting voice signals for telephone conversations.

The device 200 can include a slot interface 230 for accommodating a subscriber identity system 232 that can accommodate a SIM or universal SIM (USIM), and interfacing the subscriber identity system 232 with the processor 202. It is to be appreciated, however, that the subscriber identity system 232 can be manufactured into the device 200, and updated by downloading data and software thereto.

An image capture and processing system 234 (e.g., a camera) can be provided for decoding encoded image content. Additionally, as indicated, photos can be obtained via an associated image capture subsystem of the image system 234. The device 200 can also include a video component 236 for processing video content received and for recording and transmitting video content.

Optionally, a geolocation component 238 (e.g., GPS-global positioning system) facilitates receiving geolocation signals (e.g., from satellites via the communications component 216) that can be used to define the location of the device 200. Alternatively, or in combination therewith, the geolocation component 238 can facilitate triangulation processing for locating the device 200.

The device 200 also includes a power source 240 in the form of batteries and/or an AC power subsystem. The power source 240 can interface to an external power system or charging equipment (not shown) via a power I/O component 242.

An accessory module 102 can be in communication with the I/O interface 208 to facilitate the addition of at least one aforementioned feature to the device.

Referring now to FIG. 3, charging equipment 300 is illustrated as being connected to an external power source 302 (e.g., a wall outlet) to charge a device battery (not shown in FIG. 3) and/or an accessory module battery (not shown). The charging equipment includes a plug 304, a power cord 306, and a device connector 308. As previously described, in one embodiment, the accessory module 102 is itself a rechargeable battery or rechargeable battery case.

Referring now to FIG. 4, a device holster 400 is illustrated, according to the present invention. The device holster 400 includes each of the elements of device holster 100 illustrated in FIG. 1, with the addition of a windowed pouch 402. The windowed pouch 402 allows a display accessory module 404 to be viewed upon insertion into the pouch 402. The window portion of the pouch 402 can be open or a protective screen may be in place to prevent damage screen of the display accessory module 404.

Referring now to FIG. 5, an exemplary embodiment of a device charger module 500 is illustrated, according to the present invention. The device charger module 500 includes a retractable power plug 502 to reduce girth and allow for a portable all-in-one device and charger assembly. The device charger module 500 can be manufactured to adhere to the appropriate specifications as set forth for other device chargers.

Referring now to FIG. 6, an exemplary device holster 600 is illustrated, according to the present invention. The device holster 600 has two portions, one is an accessory module pouch 602 configured to hold an accessory module which, in the illustrated embodiment, is a keypad module 604. The accessory module pouch 602 is hingedly connected, via hinge 606, to the second portion 608 that is configured to house the main body of a device. Although a keypad module 604 is illustrated, any of the aforementioned accessory modules may be designed to be compatible with the illustrated accessory module pouch 602.

The accessory module pouch 602 may include a holster interface (not shown) similar to the pouch interface 108 illustrated in FIG. 1. The holster interface may accept a module interface similar to module interface 110, also as illustrated in FIG. 1. The module interface can be in communication via a hardwire configuration, with a device interface similar to device interface 112 illustrated in FIG. 1. It is contemplated that in this configuration the wiring may be routed through a hinge 606 to the device interface. Alternatively, the keypad module 604 or other accessory module may be wirelessly connected to the device via BLUETOOTH® or other near-field communications, radio frequency based, line-of-sight, or otherwise.

Referring now to FIG. 7, an exemplary embodiment of a device holster 700 and non-electronic accessory module 702 is illustrated in accordance with the present invention. The illustrated device holster 700 includes a pouch 704 that is configured to receive at least one non-electronic accessory module 702. The illustrated pouch 704 is configured to securely enclose the accessory module 702 by connecting a button 106. Other means for securing include tape, staples, interlocking portions (of the device holster 700 and accessory module 702), a VELCRO® brand fastener, glue or other adhesives, clasps, rivets, zippers, thread, snaps, hook and eye connectors, tight fit connectors, combinations thereof, and the like. Several of these alternatives are illustrated in FIG. 8.

In one embodiment, the non-electronic accessory module 702 is a chemical heat pack, a chemical cold pack, or a combination thereof. The terms "chemical heat pack" and "chemical cold pack" are used to describe a pack that generates heat or cools through a chemical reaction. For example, a non-renewable/disposable heat pack can generate heat through a chemical reaction that occurs by exposing the heat pack to oxygen as is known in the art. A renewable chemical heat pack or cold pack is also contemplated. For example, the technology of renewable heat packs generally involves the chemical process of exothermic crystallization of supersaturated solutions (e.g., sodium acetate). Other disposable/non-renewable or renewable chemical processes that can be safely implemented may also be used.

Referring now to FIG. 8, alternative means for securing an accessory module 800, 802, 804 to a device holster 806, 808, 810 are illustrated. In a first embodiment, an accessory module 800 is securely sewn to the device holster 806. This configuration may find application where the accessory module 800 includes a regenerative chemical heat/cold pack. The device holster 806 and the attached accessory module 800 may be heated or cooled to activate or reactivate a chemical compounded contained within the accessory module 800. A heat and cold resistant material may be used to manufacture the device holster 806. The accessory module 802 is attached to the device holster 808 via a VELCRO® brand fastener. This allows for easy detachment and reattachment of the accessory module 802. The accessory module 804 is attached to the device holster 810 via a zipper.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A device holster comprising:
    a body portion that contains a cellular telephone; and
    a pouch portion connected to the body portion, wherein the pouch portion contains an accessory module, the pouch portion comprising a pouch interface that mates with a module interface of the accessory module to enable data communications and power transmissions between the accessory module and the cellular telephone via a device interface between the accessory module and the cellular telephone, wherein the accessory module comprises one accessory module selected from the group consisting of
    a heating element that uses a resistive heating technology, wherein the heating element draws power from a power source of the cellular telephone and warms a portion of the device holster,
    a light emitting diode,
    a light source that displays a logo,
    a programmable light source that displays text,
    a device charger module comprising a retractable power plug,
    a rechargeable battery that powers the cellular telephone,
    a display accessory module,
    a keypad module,
    a communication module, and
    an input/output module.

2. The device holster of claim 1, wherein the accessory module comprises the display accessory module.

3. The device holster of claim 2, wherein the pouch comprises a window, and wherein the display accessory module is viewed through the window.

4. The device holster of claim 3, wherein the window comprises a protective screen to prevent damage to the screen of the display accessory module.

5. The device holster of claim 1, further comprising a non-renewable chemical heat pack.

6. The device holster of claim 1, further comprising a non-renewable chemical cold pack.

7. The device holster of claim 1, further comprising a renewable chemical heat pack.

8. The device holster of claim 1, further comprising a renewable chemical cold pack.

9. The device holster of claim 1, wherein a portion of the device holster comprises a heat and cold resistant material.

10. The device holster of claim 1, wherein the accessory module comprises the keypad module, and wherein the pouch portion is connected to the body portion by a hinge.

11. The device holster of claim 1, wherein the text relates to a text message.

12. The device holster of claim 1, wherein the text relates to an email message.

13. The device holster of claim 1, wherein the text relates to a telephone call.

14. The device holster of claim 1, wherein the input/output module comprises a fingerprint recognition device.

\* \* \* \* \*